US008812412B2

(12) United States Patent
Yamada

(10) Patent No.: US 8,812,412 B2
(45) Date of Patent: Aug. 19, 2014

(54) CONTROL APPARATUS

(75) Inventor: Naoyuki Yamada, Kariya (JP)

(73) Assignee: Denso Corporation, Kariya (JP)

( * ) Notice: Subject to any disclaimer, the term of this patent is extended or adjusted under 35 U.S.C. 154(b) by 383 days.

(21) Appl. No.: 13/308,813

(22) Filed: Dec. 1, 2011

(65) Prior Publication Data

US 2012/0150774 A1 Jun. 14, 2012

(30) Foreign Application Priority Data

Dec. 10, 2010 (JP) ................................ 2010-275899

(51) Int. Cl.
*G06F 15/18* (2006.01)
*F02D 41/24* (2006.01)

(52) U.S. Cl.
CPC ........ *F02D 41/2467* (2013.01); *F02D 41/2416* (2013.01); *F02D 41/247* (2013.01); *F02D 2200/0602* (2013.01)
USPC ........................................................... 706/12

(58) Field of Classification Search
CPC .............. F02D 41/247; F02D 41/2416; F02D 41/2467; F02D 2200/0602; G06F 15/18; G06N 99/005
USPC ........................................................... 706/12
See application file for complete search history.

(56) References Cited

U.S. PATENT DOCUMENTS

| | | | | |
|---|---|---|---|---|
| 6,253,748 | B1 | 7/2001 | Engel et al. | |
| 6,466,859 | B1 * | 10/2002 | Fujime | 701/106 |
| 2003/0158709 | A1 * | 8/2003 | Ishida et al. | 702/189 |
| 2003/0164166 | A1 * | 9/2003 | Takeuchi et al. | 123/674 |
| 2008/0017173 | A1 * | 1/2008 | Fujii | 123/478 |
| 2009/0063013 | A1 | 3/2009 | Nakata et al. | |
| 2009/0192693 | A1 * | 7/2009 | Bottcher et al. | 701/102 |
| 2009/0319157 | A1 * | 12/2009 | Ishizuka | 701/106 |
| 2010/0250102 | A1 * | 9/2010 | Imai et al. | 701/105 |
| 2010/0307457 | A1 * | 12/2010 | Sugiyama et al. | 123/478 |
| 2010/0324702 | A1 * | 12/2010 | Yamada et al. | 700/47 |

FOREIGN PATENT DOCUMENTS

| | | |
|---|---|---|
| JP | H9-105352 | 4/1997 |
| JP | P2000-2127 A | 1/2000 |

OTHER PUBLICATIONS

Engeru G. et al., English translation of Japanese Patent JP105352 (A) on applicant IDS, published Apr. 1997.*
Engel G. et al., English translation of Japanese Patent JP2000-002127A on applicant IDS, published Jan. 2000.*
Japanese Official Action dated Nov. 6, 2012 issued in corresponding Japanese Application No. 2010-275899, with English translation.
Office Action (6 pages) dated Dec. 27, 2013, issued in corresponding Chinese Application No. 201110404976.1 and English translation (8 pages).

* cited by examiner

*Primary Examiner* — Jeffrey A Gaffin
*Assistant Examiner* — Dave Misir
(74) *Attorney, Agent, or Firm* — Nixon & Vanderhye PC

(57) ABSTRACT

A control apparatus includes a learning portion which learns a control parameter by correcting a learning vector consisting of a plurality of variables and a control parameter based on a measurement vector. The control apparatus further includes an interpolation portion which computes the control parameter corresponding to current variables which represent a current environmental condition by interpolating the control parameter learned by the learning portion. The interpolation portion includes a selecting portion which selects three learning vectors from a plurality of learning vectors, and which computes the control parameter corresponding to the current variables by interpolating the control parameters on a flat surface including the selected three learning vectors.

4 Claims, 9 Drawing Sheets

FIG. 9A

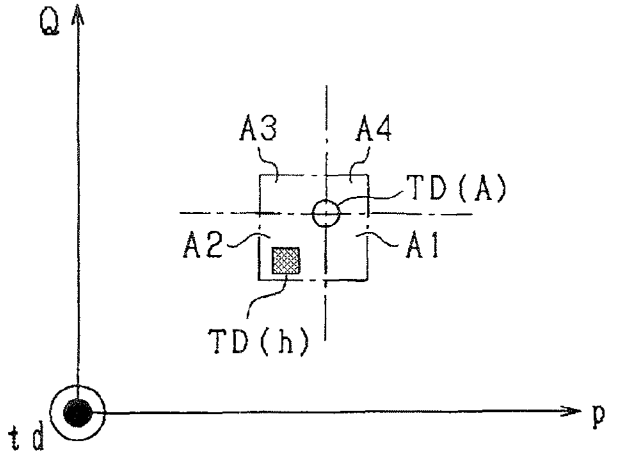

FIG. 9B

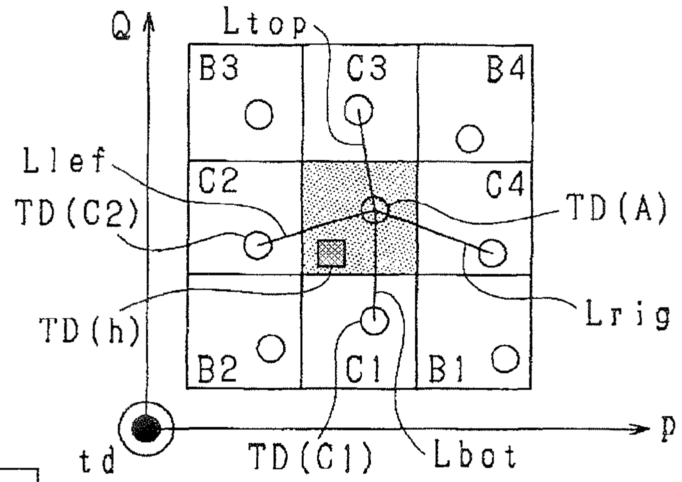

FIG. 9C

| | DETERMINATION | OBLIQUE REGION |
|---|---|---|
| A1 | LARGER THAN OR ON "Lrig"<br>SMALLER THAN "Lrig" → LARGER THAN OR ON "Lbot"<br>SMALLER THAN "Lbot" | B4<br>B1<br>B3 |
| A2 | LARGER THAN OR ON "Lbot"<br>SMALLER THAN "Lbot" → LARGER THAN OR ON "Llef"<br>SMALLER THAN "Llef" | B1<br>B2 (SELECT)<br>B3 |
| A3 | LARGER THAN OR ON "Llef"<br>SMALLER THAN "Llef" → LARGER THAN OR ON "Ltop"<br>SMALLER THAN "Ltop" | B2<br>B3<br>B4 |
| A4 | LARGER THAN OR ON "Ltop"<br>SMALLER THAN "Ltop" → LARGER THAN OR ON "Lrig"<br>SMALLER THAN "Lrig" | B3<br>B4<br>B1 |

FIG. 9D

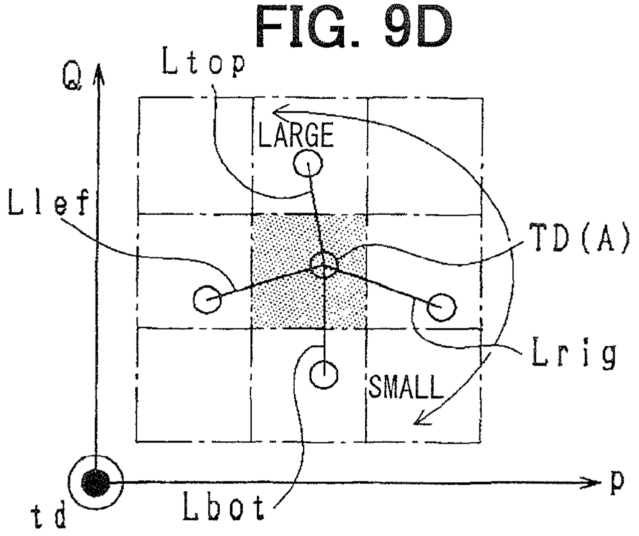

FIG. 10A
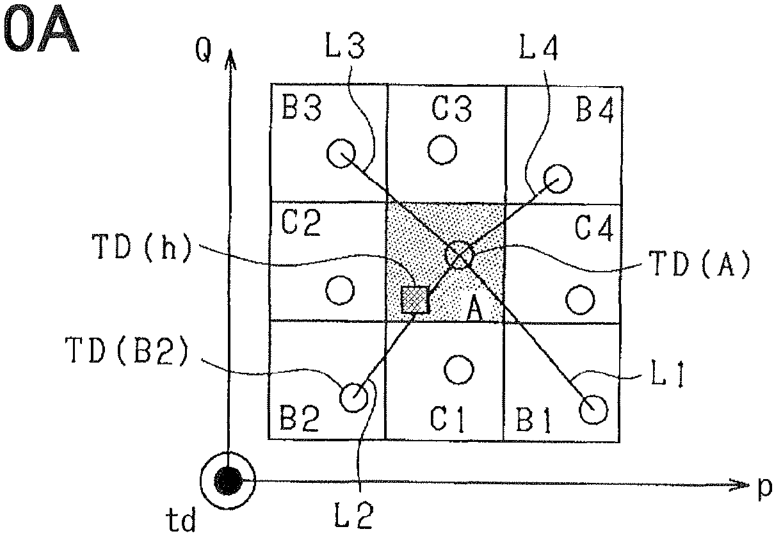
FIG. 10B
| OBLIQUE REGION | DETERMINATION | ADJACENT REGION |
|---|---|---|
| B1 | LARGER THAN "L1"<br>SMALLER THAN "L1" | C4<br>C1 |
| B2 | LARGER THAN "L2"<br>SMALLER THAN "L2" | C1<br>C2 (SELECT) |
| B3 | LARGER THAN "L3"<br>SMALLER THAN "L3" | C2<br>C3 |
| B4 | LARGER THAN "L4"<br>SMALLER THAN "L4" | C3<br>C4 |
FIG. 11
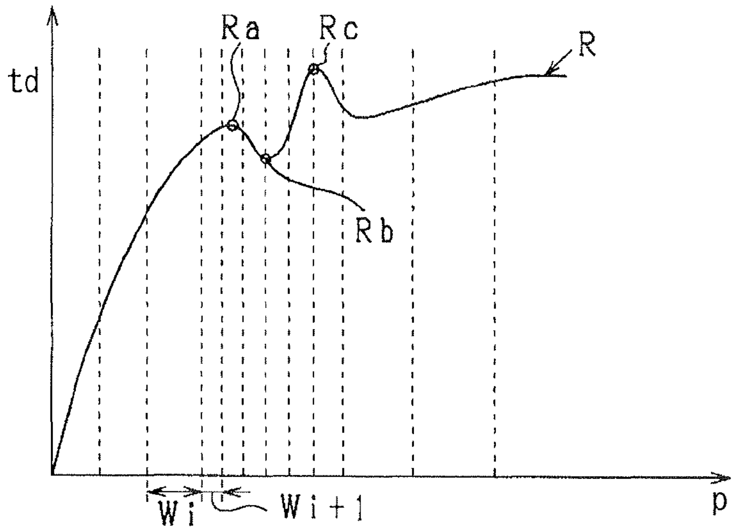

CONTROL APPARATUS

CROSS-REFERENCE TO RELATED APPLICATION

This application is based on Japanese Patent Application No. 2010-275899 filed on Dec. 10, 2010, the disclosure of which is incorporated herein by reference.

FIELD OF THE INVENTION

The present invention relates to a control apparatus which controls a control object based on a control parameter. The control parameter is computed by interpolating previously learned control parameters, so that the control parameter corresponds to current environment.

BACKGROUND OF THE INVENTION

JP-2009-57924A shows that an injection time delay "td" is defined as the control parameter. The injection time delay "td" represents a time period from when a fuel injection command is generated toward a fuel injector until when a fuel is actually injected into a cylinder of an internal combustion engine. A fuel pressure sensor provided to the fuel injector detects a time point at which the fuel pressure starts to decrease due to a fuel injection, whereby the injection time delay "td" is measured. This measured injection time delay "td" is successively learned and an output timing of the fuel injection command is controlled based on the learned time delay "td".

The injection time delay "td" depends on a fuel pressure supplied to the fuel injector at the time of fuel injection. According to the present inventor's study, the injection time delay "td" (control parameter) is learned in association with the fuel pressure (variable)

That is, as shown in FIG. 12A, the injection time delay td(30), td(50), td(80) is successively updated as a learning value with respect to the fuel pressure 30 Mpa, 50 MPa, 80 Mpa. For example, in a case that the measured time delay is indicated by a point "AO" in FIG. 12A, the learning value td(50) which is most close to the point "AO" is updated by interpolation. Specifically, an intersection between a straight line "L" connecting the learning value td(30) and the measured point "AO" and a vertical line representing the fuel pressure 50 MPa is learned as the learning value td(50).

In a case that the relationship between the fuel pressure and the time delay "td" is indicated by a curved line "R" in FIG. 12B and the measured points "A1", "A2", and "A3" are repeatedly measured on the curved line "R", the learning value td(50) is successively updated to the value "B1", "B2", "B3". That is, the learning value td(50) repeatedly increases and decreases, which may cause a hunting.

JP-2011-1916A published on Jan. 6, 2011, which corresponds to US-2010-0324702A1 published on Dec. 23, 2010, shows a learning device in which the time delay "td" and the fuel pressure are stored as vector values and a measurement vector consisting of measured values of the time delay "td" and the fuel pressure are computed. Then, a stored learning vector is updated based on the measurement vector. Thereby, it can be restricted that the updated learning vector causes a hunting.

In a case that multiple variables (for example, fuel pressure and fuel injection quantity) are correlated with a control parameter (time delay "td"), the learning map is a three-dimensional map. In such a three-dimensional map, when the control parameter corresponding to a current variable is computed by interpolating the learning vectors, it is likely that following problems may occur.

That is, in an initial stage of learning, it is likely that the stored learning value may deviate from an actual value because the stored learning value is an initial value. In a case that successive learning values are a newest learning value and an initial value, these values significantly deviate from each other. This tendency appears on a vector map.

For example, in a case of maps (usual map) shown in FIGS. 12A and 12B, when updating the learning value td(50), the learning value td(50) is updated based on the adjacent learning value td(30) and the measured point "AO". Meanwhile, in a case of a vector map, the learning vector is updated irrespective of the adjacent learning values, which causes a significant deviation between adjacent learning values.

In a three-dimensional vector map, when an intersection between a surface including multiple (four or more) learning vectors and current variables (fuel pressure and fuel injection quantity) is computed as a control parameter (time delay "td") by interpolating, since the adjacent learning vectors significantly deviate from each other, the surface for interpolation becomes a skew surface greatly twisted. Thus, a complicated interpolation by spline is necessary, whereby an interpolation processing load becomes huge.

It should be noted that the dates of publication of the above JP-2011-1916A and US-2010-0324702A1 are later than a priority date (Dec. 10, 2010) of the present application.

SUMMARY OF THE INVENTION

The present invention is made in view of the above matters, and it is an object of the present invention to provide a control apparatus for an internal combustion engine which is able to restrict a hunting of a learning value and to reduce an interpolation processing load.

According to the present invention, the control apparatus includes a learning portion which learns a control parameter in association with a plurality of variables; an interpolation portion which computes the control parameter corresponding to current variables which represent a current environmental condition by interpolating the control parameter learned by the learning portion; and a control portion which controls a control object based on the control parameter computed by the interpolation portion.

The learning portion executes a learning by correcting the learning vector consisting of the variables and the control parameter based on a measurement vector consisting of measured values of the variables and a measured value of the control parameter. The interpolating portion includes a selecting portion which selects three learning vectors from a plurality of learning vectors learned by the learning portion. Further, the interpolating portion computes the control parameter corresponding to the current variables by interpolating the control parameters on a flat surface including said three learning vectors.

In an initial stage of learning, it is likely that the stored learning vector may deviate from an actual vector because the stored learning vector is an initial vector. If the interpolation is executed on a surface including four or more learning vectors unlike the present invention, the surface includes a learning vector which significantly deviates from the actual vector and the surface becomes a skew surface twisted greatly. However, according as the learning process advances enough, the number of the learning vector deviating from the actual vector decreases, whereby the curve of the surface used for interpolation is decreased to be a flat surface. Consequently, there is no significant difference in interpolation accuracy between the case where the interpolation is executed on a surface including three learning vectors and a case where the interpolation is executed on a surface including four or more learning vectors. In other words, when the learning procedure advances well enough, sufficient interpolation accuracy is obtained by interpolating on a surface including three learning vectors. It is unnecessary to execute a complicate interpolation by means of a skew surface including four or more learning vectors.

In view of the above, according to the present invention, the control parameter corresponding to the current variables is computed by interpolating the control parameters on a flat surface including three learning vectors, whereby an interpolation processing load can be reduced. Furthermore, since the vector consisting of the control parameter and the variables are learned, it can be restricted that the learning value causes a hunting.

According to another aspect of the invention, the selecting portion selects three learning vectors in such a manner that the current variables are positioned inside of a triangle connecting said three learning vectors.

If one of three learning vectors deviates from an actual vector and the current variables exist outside of the triangle, the interpolated control parameter may deviate from an appropriate value. Meanwhile, according to the present invention, since the interpolated control parameter less receives an influence from improper values, it can be avoided that the control parameter deviates from the appropriate value.

According to another aspect of the invention, the selecting portion preferentially selects the learning vector of which variable is close to the current variable. If the relationship between the control parameter and variables is indicated by a curved line, the interpolation on a flat surface based on the learning vector of variables deviating from the current variables deteriorates its interpolation accuracy. Meanwhile, according to the present invention, since the learning vector of which variable is close to the current variable is selected for the interpolation on a flat surface, the deterioration in interpolation accuracy can be restricted.

According to another aspect of the present invention, the learning portion stores the control parameter on a map in which the variables are divided into a plurality of regions in a lattice manner. In a case that a region in which the current variables exist is referred to as an existing region, a region which is in contact with a side of the existing region is referred to as an adjacent region, and a region which is in contact with a corner of the existing region is referred to as an oblique region, the selecting portion selects the learning vector in the existing region, the learning vector in the adjacent region and the learning vector in the oblique region as said three learning vector.

As above, since the learning vectors in the existing region, the adjacent region and the oblique region are used for the interpolation, it is easily realized that the current variables exist inside of the triangle and the learning vector of which variable is close to the current variable is selected.

According to another aspect of the present invention, the control object is a fuel injector which injects a fuel into a combustion chamber of an internal combustion engine, and the fuel injector is provided with a fuel pressure sensor which detects a fuel pressure. The control apparatus further includes: a fuel pressure waveform detecting portion which detects a variation in the fuel pressure as a fuel pressure waveform based on the detection value of the fuel pressure sensor; and a fuel-injection-rate parameter computing portion which computes a fuel-injection-rate parameter required for identifying a fuel-injection-rate waveform corresponding to the fuel pressure waveform. The measured value of the control parameter is the fuel-injection-rate parameter computed by the fuel-injection-rate parameter computing portion.

The fuel-injection-rate parameter includes a fuel-injection start time delay "td", for example. That is, since the fuel pressure detected by the fuel pressure sensor starts to decrease due to a fuel injection, the actual fuel injection start time can be detected based on the detection of the fuel pressure decrease. Therefore, the time delay "td" from when the fuel injection start command signal is outputted to the fuel injector until when the fuel injection is actually started can be detected. It should be noted that since the time delay "td" varies according to the fuel pressure and the fuel injection quantity, the time delay "td" (control parameter) is learned in association with the fuel pressure (variable) and the fuel injection quantity (variable) and the output timing of the fuel injection command signal is controlled based on the learned time delay "td".

BRIEF DESCRIPTION OF THE DRAWINGS

Other objects, features and advantages of the present invention will become more apparent from the following description made with reference to the accompanying drawings, in which like parts are designated by like reference numbers and in which:

FIGS. 9A, 9B, 9C and 9D are charts for explaining a method for determining an oblique region which is used for an interpolation processing;

FIGS. 10A and 10B are charts for explaining a method for determining an adjacent region which is used for an interpolation processing;

FIG. 11 is a chart showing a map in which a plurality of regions are divided at irregular intervals.

DETAILED DESCRIPTION OF EMBODIMENTS

Hereafter, an embodiment of the present invention will be described. A control apparatus is applied to an internal combustion engine (diesel engine) having four cylinders #1-#4.

Figure 1:
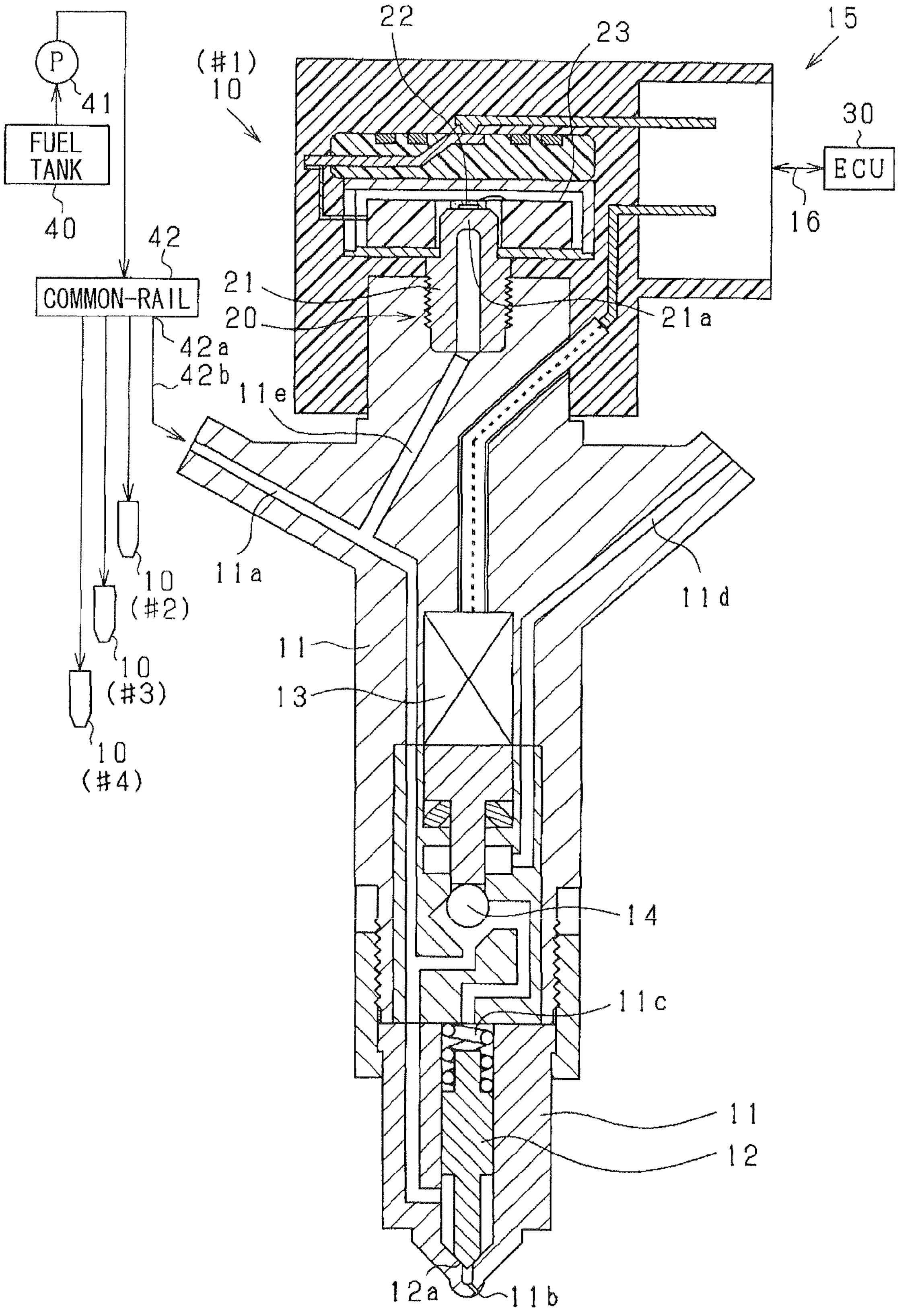
FIG. 1 is a construction diagram showing an outline of a fuel injection system on which a control apparatus is mounted, according to an embodiment of the present invention.

FIG. 1 is a schematic view showing a fuel injector 10 provided to each cylinder, a fuel pressure sensor 20 provided to each fuel injector 10, an electronic control unit (ECU) 30 and the like.

First, a fuel injection system of the engine including the fuel injector 10 will be explained. A fuel in a fuel tank 40 is pumped up by a high-pressure fuel pump 41 and is accumulated in a common-rail (accumulator) 42 to be supplied to each fuel injector 10 (#1-#4). The fuel injectors 10 (#1-#4) perform fuel injection sequentially in a predetermined order. The high-pressure fuel pump 41 is a plunger pump which intermittently discharges high-pressure fuel.

The fuel injector 10 is comprised of a body 11, a needle valve body 12, an actuator 13 and the like. The body 11 defines a high-pressure passage 11*a* and an injection port 11*b*. The needle valve body 12 is accommodated in the body 11 to open/close the injection port 11*b*.

The body 11 defines a backpressure chamber 11*c* with which the high-pressure passage 11*a* and a low pressure passage 11*d* communicate. A control valve 14 switches between the high-pressure passage 11*a* and the low pressure passage 11*d*, so that the high-pressure passage 11*a* communicates with the backpressure chamber 11*c* or the low pressure passage 11*d* communicates with the backpressure chamber 11*c*. When the actuator 13 is energized and the control valve 14 moves downward in FIG. 1, the backpressure chamber 11*c* communicates with the low pressure passage 11*d*, so that the fuel pressure in the backpressure chamber 11*c* is decreased. Consequently, the back pressure applied to the valve body 12 is decreased so that the valve body 12 is lifted up (valve-open). Meanwhile, when the actuator 13 is deenergized and the control valve 14 moves upward, the backpressure chamber 11*c* communicates with the high-pressure passage 11*a*, so that the fuel pressure in the backpressure chamber 11*c* is increased. Consequently, the back pressure applied to the valve body 12 is increased so that the valve body 12 is lifted down (valve-close).

The ECU 30 controls the actuator 13 to drive the valve body 12. When the needle valve body 12 opens the injection port 11*b*, high-pressure fuel in the high-pressure passage 11*a* is injected to a combustion chamber (not shown) of the engine through the injection port 11*b*.

The fuel pressure sensor 20 includes a stem 21 (load cell), a pressure sensor element 22 and a molded IC 23. The stem 21 is provided to the body 11. The stem 21 has a diaphragm 21*a* which elastically deforms in response to high fuel pressure in the high-pressure passage 11*a*. The pressure sensor element 22 is disposed on the diaphragm 21*a* to output a pressure detection signal depending on an elastic deformation of the diaphragm 21*a*.

The molded IC 23 includes an amplifier circuit which amplifies a pressure detection signal transmitted from the pressure sensor element 22 and includes a transmitting circuit which transmits the pressure detection signal. A connector 15 is provided on the body 11. The molded IC 23, the actuator 13 and the ECU 30 are electrically connected to each other through a harness 16 (signal line) connected to the connector 15. The amplified pressure detection signal is transmitted to the ECU 30. Such a signal communication processing is executed with respect to each cylinder.

Figure 2A:
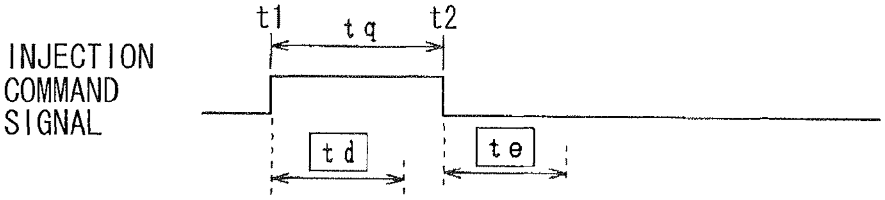
FIGS. 2A, 2B, 2C, and 2D are graphs showing variations in a fuel injection rate, a fuel pressure, and a differentiation value change relative to a fuel injection command signal.

The ECU 30 has a microcomputer which computes a target fuel injection condition, such as a number of fuel injection, a fuel-injection-start timing, a fuel-injection-end timing, and a fuel injection quantity. For example, the microcomputer stores an optimum fuel-injection condition with respect to the engine load and the engine speed as a fuel-injection condition map. Then, based on the current engine load and engine speed, the target fuel-injection condition is computed in view of the fuel-injection condition map. The fuel injection command signals "t1", "t2", "Tq" (FIG. 2A) corresponding to the computed target injection condition are established based on fuel injection parameters "td", "te", Rα, Rβ, Rmax. These command signals are transmitted to the fuel injector 10.

Figure 2B:
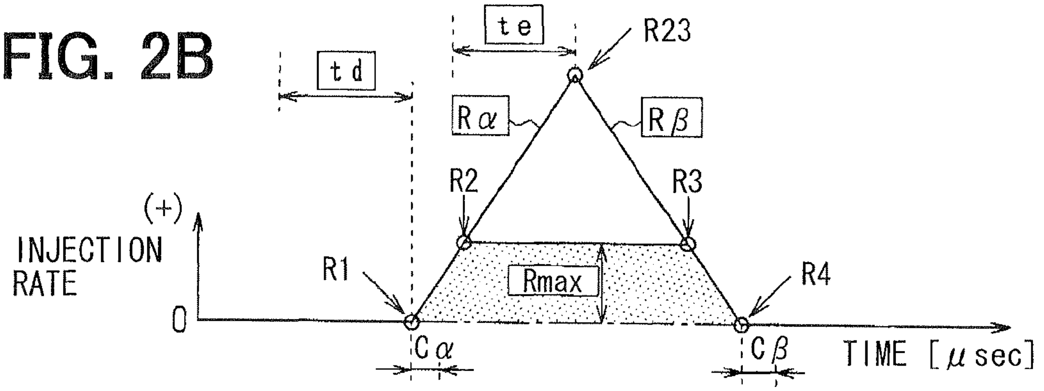
Figure 2C:
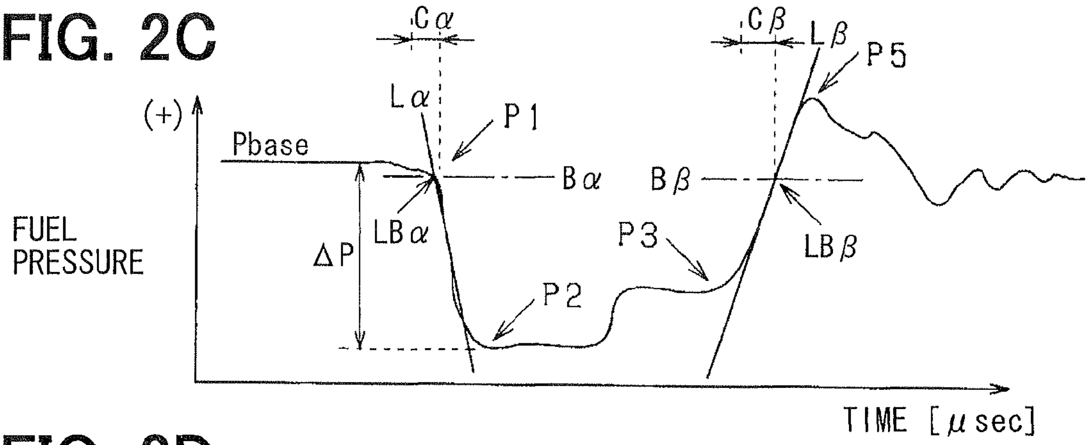
Figure 2D:
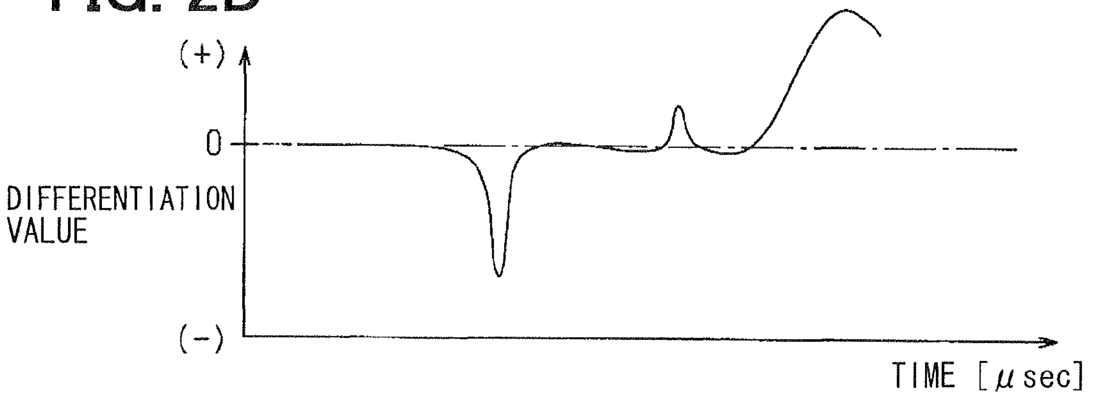

It should be noted that the actual fuel-injection condition varies relative to the fuel-injection-command signal due to aging deterioration of the fuel injector 10, such as abrasion and clogging of the injection port 11*b*. Hence, based on the detection value of the fuel pressure sensor 20, a variation in fuel pressure is illustrated by a fuel pressure waveform (refer to FIG. 2C). Further, based on this fuel pressure waveform, a fuel-injection-rate waveform (FIG. 2B) representing a variation in fuel injection rate is computed, whereby a fuel injection condition is detected. Then, the fuel-injection-rate parameters Rα, Rβ, Rmax which identify the injection rate waveform are learned, and the fuel-injection-rate parameters "te", "td" which identify the correlation between the injection command signals (pulse-on timing t1, pulse-off timing t2 and pulse-on period Tq) and the fuel injection condition are learned. Specifically, the fuel injection start delay "td", the fuel injection end delay "te", the injection rate increasing inclination Rα, the injection rate decreasing inclination Rβ, and the maximum injection rate Rmax are learned, which are shown in FIG. 2B.

Figure 3:
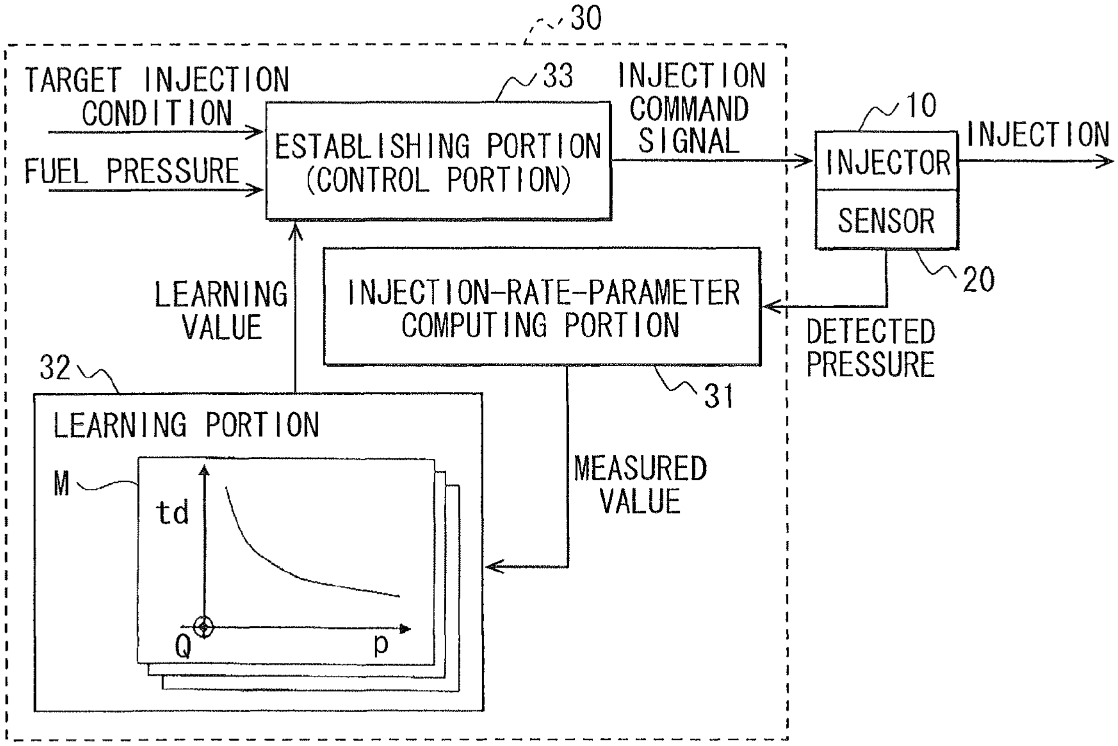
FIG. 3 is a block diagram showing a learning process of a fuel-injection-rate parameter and a setting process of a fuel injection command signal.

FIG. 3 is a block diagram for explaining the learning of the injection rate parameters and the establishment of the fuel injection command signal. An injection-rate-parameter computing portion (injection condition analysis portion) 31 computes the injection rate parameters "td", "te", Rα, Rβ based on the fuel pressure waveform detected by the fuel pressure sensor 20.

A learning portion 32 learns the computed injection rate parameters and stores the updated parameters in a memory of the ECU 30. Since the injection rate parameters vary according to the supplied fuel pressure (fuel pressure in the common rail 2), it is preferable that the injection rate parameters are learned in correlation with the supplied fuel pressure or a reference pressure Pbase. Further, the fuel-injection-rate parameters other than the maximum fuel-injection-rate Rmax is preferably learned in correlation with the fuel injection quantity. The fuel-injection-rate parameters corresponding to the fuel pressure is stored in a fuel-injection-rate parameter map M.

An establishing portion (control portion) 33 obtains the fuel-injection-rate parameter (learning value) corresponding to the current fuel pressure from the fuel-injection-rate parameter map M. Then, based on the obtained fuel-injection-rate parameter, the portion 33 establishes the fuel-injection-command signals "t1", "t2", "Tq" which correspond to the target fuel injection condition. When the fuel injector 10 is operated according to the above fuel-injection-command signals, the fuel pressure sensor 20 detects the fuel pressure waveform. Based on this the fuel pressure waveform, the injection-rate-parameter computing portion 31 computes the fuel-injection-rate parameters "td", "te", Rα, Rβ, Rmax.

That is, the actual fuel injection condition (injection rate parameters "td", "te", Rα, Rβ, Rmax) corresponding to the fuel injection command signal is detected and learned. Based on this learning value, the fuel injection command signal correspond to the target injection condition is established. Therefore, the fuel injection command signal is feedback controlled based on the actual injection condition, whereby the actual fuel injection condition is accurately controlled in such a manner as to agree with the target injection condition even if the deterioration with age is advanced.

A learning processing of the fuel-injection-start delay "td" in the learning portion 32 will be described hereinafter.

Figure 4:
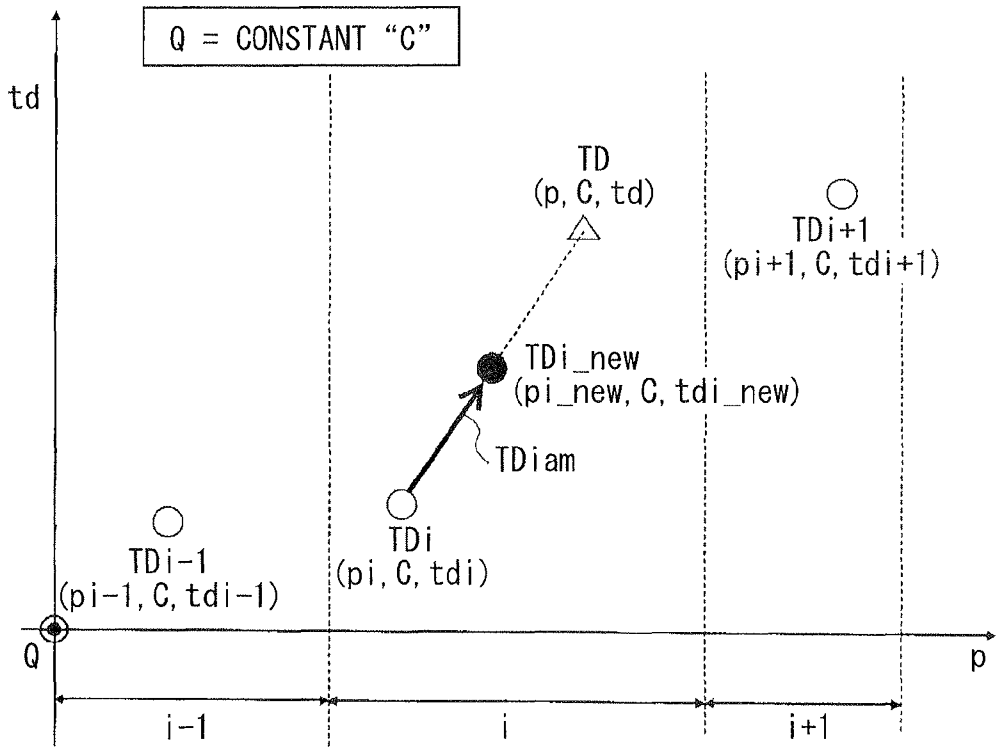
FIG. 4 is a chart showing a process for correcting and updating a learning vector.
Figure 5A:
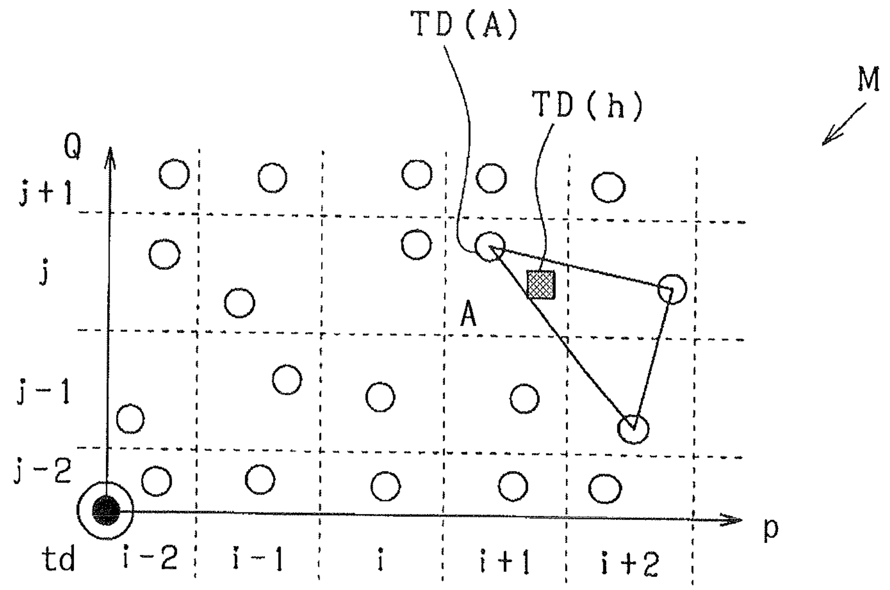
FIGS. 5A and 5B are charts for explaining a three-dimensional map.
Figure 5B:
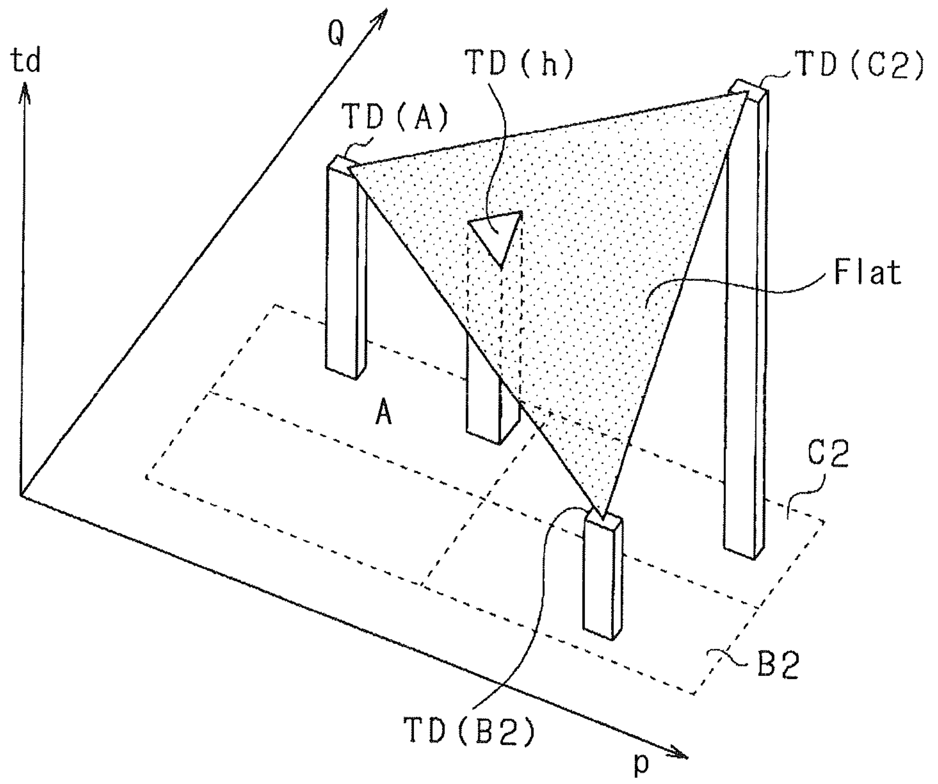

FIG. 4 is a three-dimensional map M which shows a relationship between the time delay "td", the fuel pressure "p"

and the fuel injection quantity "Q". The axis of ordinates indicates the time delay "td", the axis of abscissas indicates the fuel pressure "p" and the axis perpendicularly extending in FIG. 4 represents the fuel injection quantity "Q". FIG. 5A is also a three-dimensional map M in which the axis of ordinates indicates the fuel injection quantity "Q", the axis of abscissas indicates the fuel pressure "p" and the axis perpendicularly extending in FIG. 5A represents the time delay "td". FIG. 5B is a perspective view of the map M. As shown in FIG. 5A, the fuel injection quantity "Q" and the fuel pressure "p" are divided into a plurality of regions "i" and "j". With respect to each region, an updated time delay "td" is stored. In order to store the time delay "td" in correlation with the fuel pressure "p" and the fuel injection quantity "Q", a learning vector consisting of the time delay "td", the fuel pressure "p" and the fuel injection quantity "Q" is defined and this learning vector is stored in each region "i" and "j".

FIG. 4 is a two-dimensional map in a case that the fuel injection quantity "Q" is a constant value C. In a region "i−1", the learning vector is defined as TDi−1(pi−1, C, tdi−1). In a region "i", the learning vector is defined as TDi(pi, C, tdi). In a region "i+1", the learning vector is defined as TDi+1(pi+1, C, tdi+1). Thus, the learning vector does not represent the time delay "td" relative to the specific fuel pressure "p" but the time delay "td" relative to any fuel pressure "p". It is unnecessary to drive the high-pressure pump 41 so that the specified fuel pressure "p" is obtained for learning. The learning can be conducted based on any fuel pressure.

An injection-rate-parameter computing portion 31 defines a measurement vector TD(p, C, Td) based on the measured time delay "td", the fuel pressure "p" and the fuel injection quantity C. In a case that the fuel pressure "p" of the measurement vector TD(p, C, td) corresponds to the region "i", the learning vector TDi(pi, C, tdi) in the region "i" is corrected based on the measurement vector TD(p, C, td) to be stored.

Figure 6:
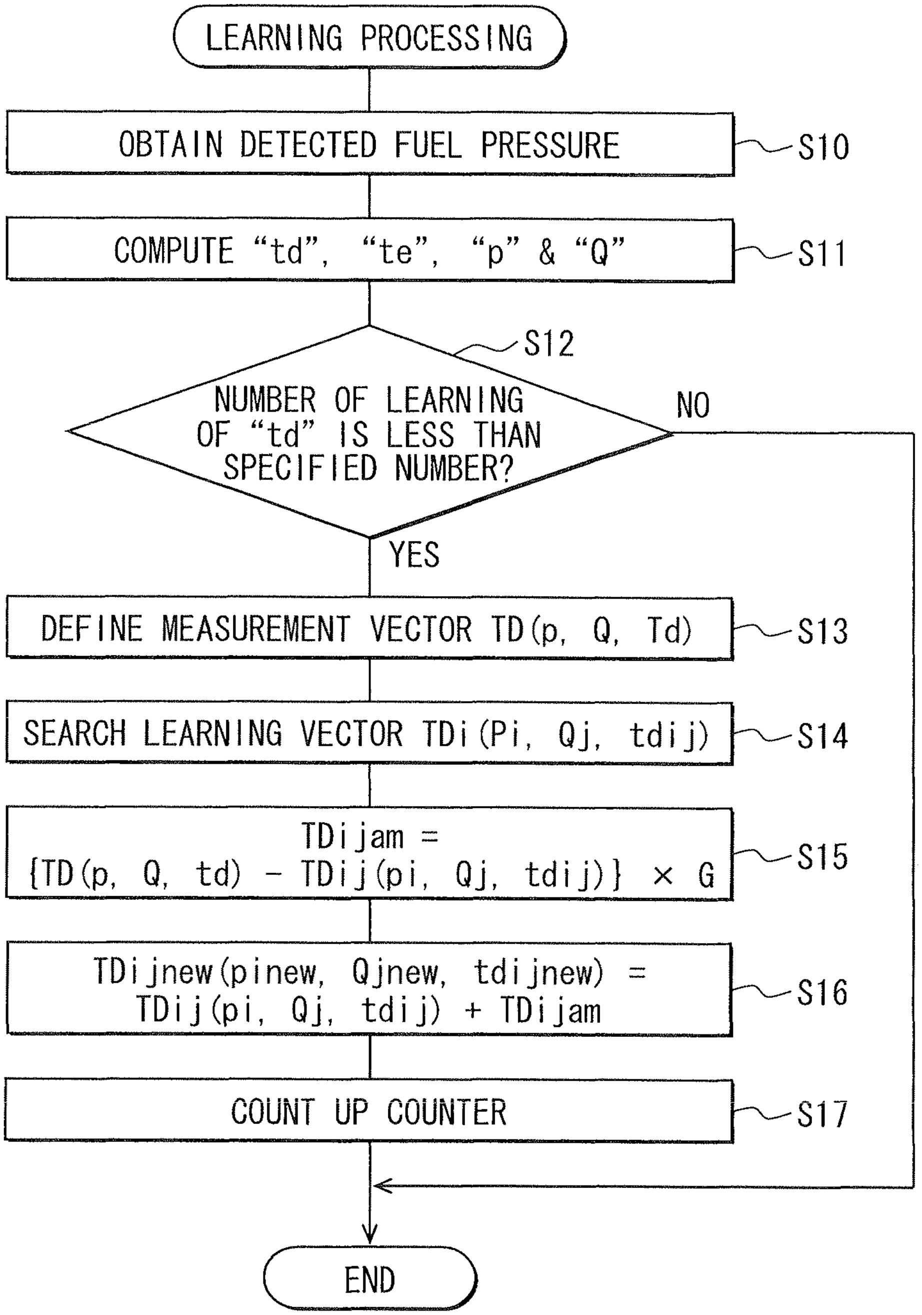
FIG. 6 is a flowchart showing a processing for learning a learning vector.

Referring to a flowchart shown in FIG. 6, a procedure of the learning will be described. This processing shown in FIG. 6 is repeatedly executed by the microcomputer of the ECU 30 every when a fuel injection is performed.

In step S10, which corresponds to a measurement vector obtaining portion, the detected fuel pressure from the fuel pressure sensor 20 and the fuel pressure waveform indicating variation in the fuel pressure are obtained. In step S11, which corresponds to a measurement vector obtaining portion, the injection-rate-parameter computing portion 31 computes the fuel-injection-rate parameter (td, te), the fuel pressure "p" and the fuel injection quantity "Q" of the time when the fuel injection is started. An example in which the time delay "td" is the fuel-injection-rate parameter will be described hereinafter. In step S12, it is determined whether the number of learning of the time delay "td" is less than a specified number.

When the answer is NO in step S12, it is determined that more learning is unnecessary, so that the processing is terminated. So, the learning processing load of ECU 30 can be reduced. When the answer is YES in step S12, the learning of the time delay "td" is executed in steps S13 to S16.

In step S13, a vector consisting of the time delay "td", the fuel pressure "p" and the fuel injection quantity "Q" computed in step S11 is defined as a measurement vector TD(p, Q, Td). That is, the measurement vector TD(p, Q, Td) is obtained based on the fuel pressure measured by the fuel pressure sensor 20.

In step S14, based on the fuel pressure "p" and the fuel injection quantity "Q" computed in step S11, a learning vector which should be updated is searched. That is, it is searched which region "i−1", "i", "i+1" corresponds to the fuel pressure "P", and it is searched which region "j−1", "j", "j+1" corresponds to the fuel injection quantity "Q". Then, the learning vector in the searched region is updated. FIG. 4 shows a case in which the measurement vector TD(td, C, p) denoted by Δ is obtained. Since the fuel pressure "p" of the measurement vector TD(td, C, p) exists in the region "i", the learning vector TDi(pi, tdi) in the region "i", which is denoted by ○, is updated.

In step S15 (correction vector computing), a correction vector is computed based on the learning vector TDij(pi, Qj, tdij) and the measurement vector TD(p, Q, td). Specifically, the learning vector TDij(pi, Qj, tdij) is subtracted from the measurement vector TD(p, Q, td). This obtained vector is multiplied by a specified ratio G (0<G<1) to compute a correction vector TDijam.

$$TDijam=\{TD(p,Q,td)-TDij(pi,Qj,tdij)\}\times G$$

The specified ratio G is constant in any regions. Alternatively, the specified ratio G may have different value in each region. For example, as the number of learning is less, the specified ratio G is set larger, so that the learning vector is brought into an actual value early and a hunting of the learning vector is restricted.

In step S16, which corresponds to a correction portion, the correction vector TDijam computed in step S15 is added to the learning vector TDi(pi, Qj, tdij) to update and store the learning vector TDij(pi, Qj, tdij).

$$\text{Updated learning vector } TDij\text{new}(pi\text{new},Qj\text{new},tdij\text{new})=TDij(pi,Qj,tdij)+TDijam$$

In step S17, a counter which counts the number of learning in step S12 is counted up. It should be noted that the number of learning may be determined with respect to each region in step S12. In such a case, the number of learning is counted up with respect to the region in which the learning vector is updated in step S16.

When the establishing portion 33 establishes the fuel injection command signal, it is necessary that the fuel-injection-rate parameter corresponding to the current fuel pressure "p" and the fuel injection quantity "Q" (variables) is computed by interpolating the learning vector and then the fuel injection command signal is established based on the above fuel-injection-rate parameter (interpolation vector TD(h)). In FIGS. 5A and 5B, TD(h) denotes an interpolation vector consisting of the fuel-injection-rate parameter corresponding to the current variable, the current fuel pressure "p" and the current fuel injection quantity Q.

Figure 7:
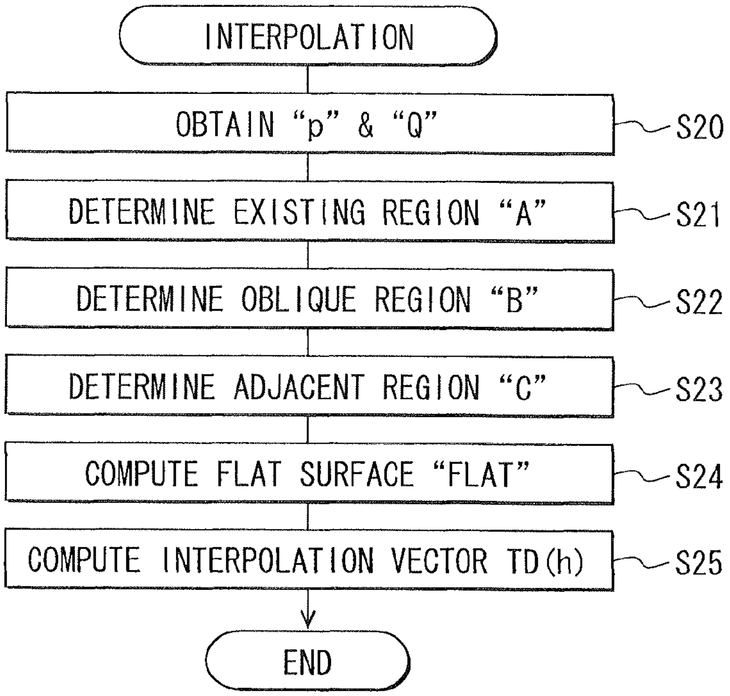
FIG. 7 is a flowchart showing a processing for interpolating an injection rate parameter (control parameter) based on the learning vector.

Referring to a flowchart shown in FIG. 7, a procedure for computing the interpolation vector TD(h) by interpolating the learning vector will be described. The processing shown in FIG. 7 is repeatedly executed by the microcomputer of the ECU 30 every when a fuel injection command signal is established.

Figure 8:
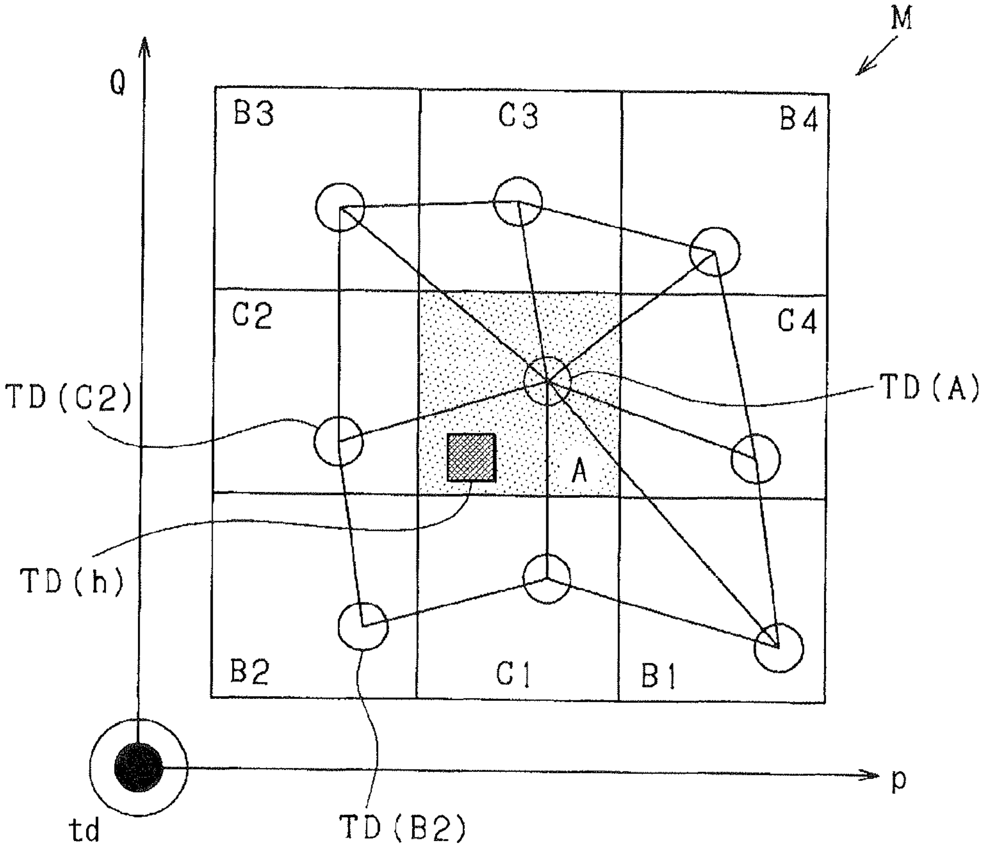
FIG. 8 is a chart for explaining a method for determining an existing region which is used for an interpolation processing.

In step S20, the current fuel pressure "p" and the current fuel injection quantity "Q" are obtained as the current variables. For example, the reference pressure Pbase and the fuel injection quantity "Q" computed by the injection-rate-parameter computing portion 31 are used as the current variables. In FIG. 5A, the current variable exists in a region where the pressure "p" is in a region "i+1" and the fuel injection quantity "Q" is in a region "j". This region where the current variable exists is referred to as an existing region "A" (refer to FIG. 8), hereinafter. Further, four regions which are in contact with corners of the existing region "A" are referred to as oblique regions "B1"-"B4" and four regions which are in contact with sides of the existing region "A" are referred to as adjacent regions "C1"-"C4". FIG. 8 is the map M in which the perpendicular axis represents the time delay "td". FIG. 8 shows only the regions "A", "B1"-"B4" and "C1"-"C4".

In step S21, which corresponds to a selecting portion, the existing region "A" is determined based on the current variables "p", "Q" obtained in step S20. In step S22, which corresponds to the selecting portion, one oblique surface for computing a flat surface "Flat" is determined among four oblique regions "B1"-"B4". Specifically, according to a rule shown in FIGS. 9A to 9D, the oblique surface is determined based on the learning vector TD(A) in the existing region "A" and the learning vectors TD(C1)-TD(C4) in the adjacent regions "C1"-"C4".

That is, as shown in FIG. 9A, the existing region "A" is divided into four regions "A1"-"A4" around the learning vector TD(A). Then, it is determined which one of four regions "A1"-"A4" includes the current variables "p" and "Q" (interpolation vector TD(h)). In FIG. 9A, it is determined that the interpolation vector TD(h) exists in the region "A2".

Then, two adjacent regions which are adjacent to the region "A2" are selected from four adjacent regions "C1"-"C4", as shown in FIG. 9B. In the present embodiment, the regions "C1" and "C2" are selected. Then, a line "Lbot" connecting the learning vector TD(C1) in the adjacent region "C1" and the learning vector TD(A) is defined. Further, a line "Llef" connecting the learning vector TD(C2) in the adjacent region "C2" and the learning vector TD(A) is defined.

The position of the interpolation vector TD(h) relative to the lines "Lbot" and "Llef" is determined according to the rule shown in FIGS. 9C and 9D. A counterclockwise direction relative to the defined lines around the learning vector TD(A) is defined as "Large", and a clockwise direction relative to the defined lines around the learning vector TD(A) is defined as "Small". The interpolation vector TD(h) is "Small" relative to the line "Lbot" and is "Large" relative to the line "Llef". Based on the above determination result and the rule shown in FIG. 9C, the oblique region for computing the surface "Flat" is determined. In the present embodiment, the oblique region "B2" is determined for computing the surface "Flat".

Referring back to FIG. 7, in step S23 (selecting portion), one adjacent region for computing the surface "Flat" is selected from two adjacent regions "C1" and "C2" which are adjacent to the oblique region "B2". Specifically, the adjacent region is determined based on the learning vector TD(A) in the existing region "A" and the learning vector TD(B2) in the oblique region "B2" according to the rule shown in FIGS. 10A and 10B.

That is, a line "L2" connecting the learning vector TD(B2) and the learning vector TD(A) is defined. Then, the position of the interpolation vector TD(h) relative to the line "L2" is determined according to the rule shown in FIG. 9D and FIG. 10B. In FIG. 10A, it is determined that the interpolation TD(h) is "Small" relative to the line "L2". Based on this, the adjacent region "C2" is determined as the region for computing the surface "Flat".

By executing the processes in steps S20-S23, the existing region "A", the oblique region "B2" and the adjacent region "C2" are determined for computing the surface "Flat". The current variables "p" and "Q" (that is, the interpolation vector TD(h)) are positioned inside of a triangle connecting the learning vectors TD(A), TD(B2) and TD(C2) in the regions "A", "B2", and "C2", as shown in FIG. 5B. Furthermore, the region of the learning vector "td" which is close to the current variables "p" and "Q" (interpolation vector TD(h)) is determined.

In step S24, the surface "Flat" including the learning vectors TD(A), TD(B2), and TD(C2) is computed. Since the surface "Flat" is computed based on the learning vectors TD(A), TD(B2) and TD(C2), the surface "Flat" is always a flat surface. In step S25, which corresponds to an interpolation portion, based on the current variables "P", "Q" and the surface "Flat", the time delay "td" (control parameter) is computed with respect to the interpolation vector Td(h). That is, the time delay "td" of the point corresponding to the current variables "p" and "Q" on the surface "Flat" is computed as the time delay "td" of the interpolation vector TD(h). As above, the control parameter corresponding to the current variables "p" and "Q" is computed and the establishing portion 33 establishes a fuel injection command signal by means of the control parameter.

In an initial stage of learning shown in FIG. 6, it is likely that the stored learning vector may deviate from an actual vector because the stored learning vector is an initial vector. If the interpolation is executed on a surface including four or more learning vectors TD, the surface includes a learning vector which significantly deviates from the actual vector and the surface becomes a skew surface twisted greatly. However, according as the learning process advances enough, the number of the learning vector deviating from the actual vector decreases, whereby the curve of the surface used for interpolation is decreased to be a flat surface. Especially, according to the present embodiment, since the fuel pressure "p" and the fuel injection quantity "Q" are divided at irregular intervals (Wi, Wi+1) according to the control parameter (learning value) as shown in FIG. 11, there is no significant difference between the learning value in adjacent regions. The region is divided in such a manner that the learning value gradually changes along with the regions. Therefore, the above skew surface gradually becomes a flat surface along with the learning.

Consequently, there is no big difference in interpolation accuracy between the case where the interpolation is executed on a surface including three learning vectors and a case where the interpolation is executed on a surface including four or more learning vectors. In other words, when the learning procedure advances well enough, the sufficient interpolation accuracy is obtained by interpolating on a surface including three learning vectors. It is unnecessary to execute a complicate interpolation by means of a skew surface including four or more learning vectors. In view of the above, according to the present embodiment, the control parameter of the interpolation vector TD(h) corresponding to the current variables "p" and "Q" is computed by executing an interpolation on the surface "Flat" including three learning vectors TD(A), TD(B2), and TD(C2). Thus, an interpolation processing load of the ECU 30 can be reduced.

Figure 12A:
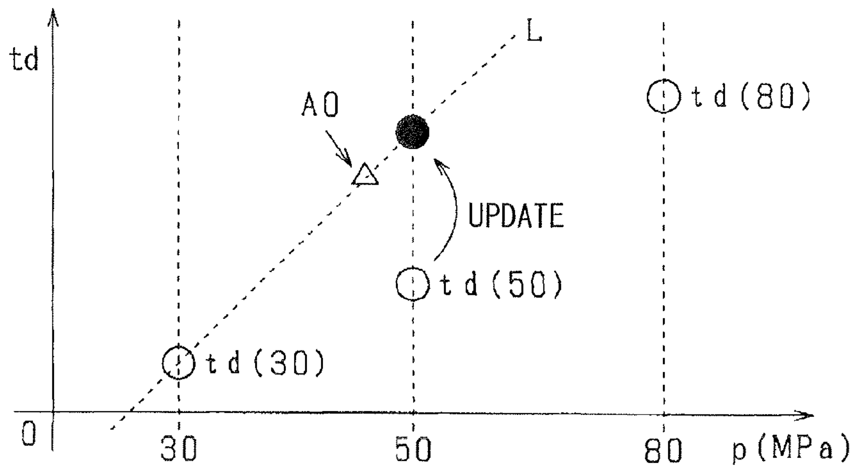
FIG. 12A PRIOR ART
FIGS. 12A and 12B are charts for explaining a conventional learning method.
Figure 12B:
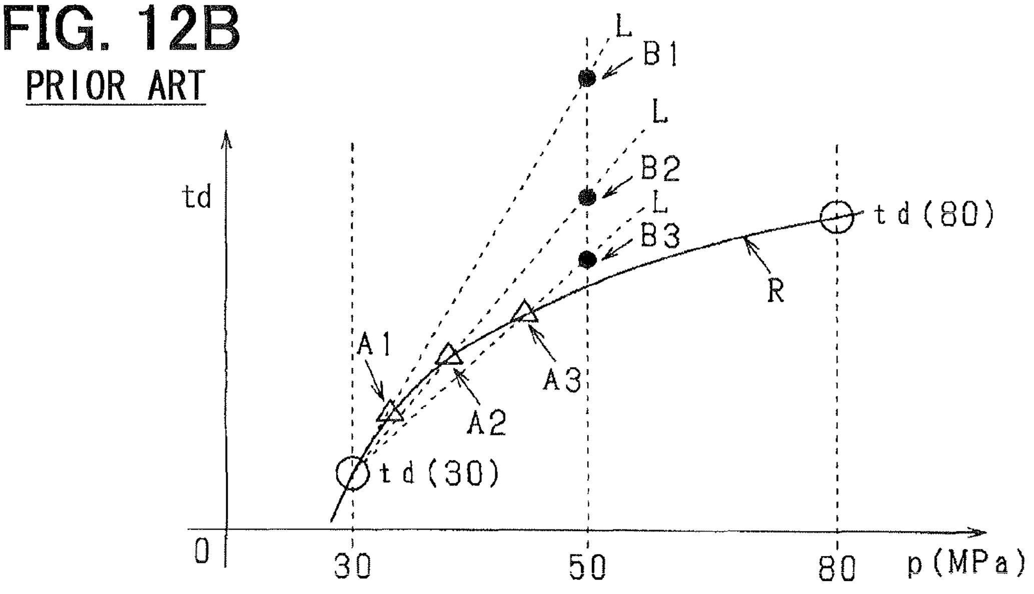
FIG. 12B PRIOR ART

Furthermore, according to the present embodiment, instead of storing the control parameters (td(30), td(50), td(80) in FIG. 12) corresponding to the specific value (30 Mpa, 50 Mpa, 80 Mpa) of the fuel pressure "p", the learning vectors (TDi−1, TDi, TDi+1 in FIG. 4) consisting of the control parameter (time delay "td") and the variables (fuel pressure "p" and fuel injection quantity "Q") are stored. Then, based on the measurement vector consisting of the measured value of the time delay "td" and the measured fuel pressure "p", the learning vector is corrected. Even if the relationship between the time delay "td", the fuel pressure "p" and the fuel injection quantity "Q" is expressed by a curved line, it is well restricted that the value of the updated learning causes a hunting.

Furthermore, since the correction vector TDiam is computed by multiplying the difference between the measurement vector "td" and the learning vector TDi by a specified ratio G ($0<G<1$), it can be restricted that the updated learning vector causes a hunting more than a case where the difference is added to the learning vector TD1 to be corrected.

In the embodiment shown in FIG. 11, a plurality of regions are divided at irregular intervals (Wi, Wi+1) according to a distribution of the learning vectors. For example, in a case that the distribution of the learning vector is represented by a curved line "R" in FIG. 11, it is assumed that the distribution of the actual value in the region Wi+1 is represented by a curved line. The width of the region Wi+1 is set narrower than that of the region Wi in which the distribution of the actual value is represented by a straight line. Alternatively, at a vicinity of extreme values (Ra, Rb, Rc) on the curved line "R", it is assumed that the actual vector is also extreme value. Thus, its interval of the region is made narrower. According to the above, since the learning vector can be updated finely with respect to the region of which actual value is rapidly changed, the learning vector can be accurately brought into an actual vector.

Also, when the portion 33 establishes the fuel injection command signals t1, t2, Tq by means of the learned injection rate parameters (td, te, Rmax and the like), the frequency of the case where the learning vector "td" stored in the map M is used for establishing the fuel injection command signal depends on the region. The region may be divided at irregular intervals according to the frequency of the case. For example, the learning vector is frequently used with respect to the fuel pressure "p" when the engine is at idle state. In such a region, its width is set narrower.

OTHER EMBODIMENT

The present invention is not limited to the embodiments described above, but may be performed, for example, in the following manner. Further, the characteristic configuration of each embodiment can be combined.

In the above embodiment, the learning vectors TD(A), TD(B2) and TD(C2) are defined in such a manner that the interpolation vector TD(h) is positioned inside of the triangle connecting the learning vectors TD(A), TD(B2) and TD(C2). According to another embodiment, the interpolation vector TD(h) may be positioned outside of the triangle.

When defining three learning vectors for computing the surface "Flat", three learning vectors may be defined in an order that the variables "p" and "Q" of the learning vector are more close to the current variables "p" and Q.

The region corresponding to three learning vectors may be selected from two oblique region and the existing region "A", or two adjacent regions and the existing region "A".

In the above embodiment, an arbitrary injection-rate parameter (for example, fuel injection start time delay "td") is stored in correlation with the two variables "p" and "Q". According to another embodiment, an arbitrary injection-rate parameter "td" may be stored in association with another injection-rate parameter (for example, fuel injection end time delay "te") and one variable.

The specified ratio G may be set to "1". That is, a vector obtained by subtracting the learning vector TDi(pi, Qi, tdi) from the measurement vector TD(p, Q, td) may be defined as the correction vector TDiam.

In the above embodiment, when it is determined that the number of learning of the time delay "td" is greater than or equal to a specified number in step S12, the learning procedure is terminated. Alternatively, when a learning period of the learning vector exceeds a specified time period, the learning procedure may be terminated.

What is claimed is:

1. A control apparatus comprising:

a microcomputer configured to:

learn a control parameter in association with a plurality of variables;

compute the control parameter corresponding to current variables which represent a current environmental condition by interpolating the learned control parameter; and control a control object based on the control parameter computed by the interpolation, wherein a learning is executed by correcting a learning vector comprising the variables and the control parameter based on a measurement vector comprising measured values of the variables and a measured value of the control parameter, three learning vectors are selected from a plurality of learned learning vectors, the control parameter corresponding to the current variables is computed by interpolating the control parameters on a flat surface including said three learning vectors, and the three learning vectors are selected in such manner that the current variables are positioned inside of a triangle connecting said three learning vectors.

2. A control apparatus according to claim 1, wherein the learning vector of which variable is close to the current variable is preferentially selected.

3. A control apparatus according to claim 1, wherein the microcomputer is further configured to store the control parameter on a map in which the variables are divided into a plurality of regions in a lattice manner, in a case that a region in which the current variables exist is referred to as an existing region, a region which is in contact with a side of the existing region is referred to as an adjacent region, and a region which is in contact with a corner of the existing region is referred to as an oblique region, the learning vector is selected in the existing region, the learning vector is selected in the adjacent region and the learning vector is selected in the oblique region as said three learning vectors.

4. A control apparatus according to claim 1, wherein the control object is a fuel injector which injects a fuel into a combustion chamber of an internal combustion engine, and the fuel injector is provided with a fuel pressure sensor which detects a fuel pressure, the microcomputer is further configured to:

detect a variation in the fuel pressure as a fuel pressure waveform based on the detection value of the fuel pressure sensor; and compute a fuel-injection-rate parameter required for identifying a fuel-injection-rate waveform corresponding to the fuel pressure waveform, the measured value of the control parameter is the computed fuel-injection-rate parameter.

* * * * *